US006892135B1

(12) United States Patent
Krull et al.

(10) Patent No.: US 6,892,135 B1
(45) Date of Patent: May 10, 2005

(54) NAVIGATION SYSTEM, METHOD AND DEVICE WITH AUTOMATIC NEXT TURN PAGE

(75) Inventors: Jay Dee Krull, Olathe, KS (US); Mark D. Tompkins, Overland Park, KS (US); Shane R. Runquist, Austin, TX (US)

(73) Assignee: Garmin Ltd. (KY)

( * ) Notice: Subject to any disclaimer, the term of this patent is extended or adjusted under 35 U.S.C. 154(b) by 46 days.

(21) Appl. No.: 10/029,917

(22) Filed: Dec. 21, 2001

(51) Int. Cl.[7] .............................................. G01C 21/32
(52) U.S. Cl. ..................... 701/211; 701/210; 701/212; 340/995.15; 340/995.2
(58) Field of Search ............................... 701/211, 201, 701/202, 208, 209, 210, 212; 340/988, 990, 995.01, 995.14, 995.15, 995.17, 995.2, 995.25, 995.28, 995

(56) References Cited

U.S. PATENT DOCUMENTS

| | | | |
|---|---|---|---|
| 5,371,497 A | 12/1994 | Nimura et al. ............. 340/995 |
| 5,528,248 A | 6/1996 | Steiner et al. ............. 342/357 |
| 5,537,323 A | 7/1996 | Schulte ..................... 364/449 |
| 5,638,279 A | 6/1997 | Kishi et al. ................ 364/443 |
| 5,729,109 A | * 3/1998 | Kaneko et al. ............ 318/587 |
| 5,739,772 A | 4/1998 | Nanba et al. .............. 340/990 |
| 5,874,905 A | 2/1999 | Nanba et al. .............. 340/995 |
| 5,938,721 A | 8/1999 | Dussell et al. ............. 701/211 |
| 6,052,645 A | * 4/2000 | Harada ...................... 701/212 |
| 6,061,003 A | * 5/2000 | Harada ...................... 340/995 |
| 6,088,652 A | * 7/2000 | Abe ........................... 701/208 |
| 6,121,900 A | 9/2000 | Takishita .................. 340/995 |
| 6,151,552 A | * 11/2000 | Koizumi et al. ............ 701/211 |
| 6,182,010 B1 | * 1/2001 | Berstis ....................... 701/211 |
| 6,199,013 B1 | 3/2001 | O'Shea ...................... 701/211 |
| 6,202,026 B1 | 3/2001 | Nimura et al. ............. 701/211 |
| 6,249,740 B1 | * 6/2001 | Ito et al. .................... 701/200 |
| 6,263,276 B1 | * 7/2001 | Yokoyama et al. ......... 701/207 |
| 6,266,612 B1 | 7/2001 | Dussell et al. ............. 701/207 |
| 6,317,684 B1 | 11/2001 | Roeseler et al. ........... 701/202 |
| 6,317,687 B1 | 11/2001 | Morimoto et al. ......... 701/211 |
| 6,321,158 B1 | 11/2001 | DeLorme et al. .......... 701/201 |
| 6,411,899 B2 | 6/2002 | Dussell et al. ............. 701/211 |

OTHER PUBLICATIONS

"An optimal pathfinder for vehicles in real–world digital terrain maps", http://www.nease.net/jamsoft/shortestpath/pathfinder/4.html, 11 pages, (1999).
"Informed Search Methods", *Artificial Intelligence, A Modern Approach*, Prentice Hall, Inc., pp. 92–115, (1995).
"Real–Time Vehicle Routing in Dynamic and Stochastic Urban Traffic Networks", http://www.gpu.srv.ualberta.ca/lfu/research.htm, pp. 1–3, (1997).

(Continued)

*Primary Examiner*—Tan Q. Nguyen
(74) *Attorney, Agent, or Firm*—DeVon A. Rolf

(57) ABSTRACT

Systems, devices and methods are provided for an improved navigational route planning device which provides more understandable, accurate and timely information for negotiating a decision point along a route. The navigational aid device includes a processor adapted to communicate with a memory. The memory has cartographic data and a route to a desired destination stored therein. The cartographic data includes data indicative of thoroughfares of a plurality of types. A display is provided which is adapted to communicate with the processor and the memory and which is capable of displaying the cartographic data. The device processes travel along the route. The device recognizes when the device is approaching a decision point in the route and provides to the display an overlay screen on top of any presently displayed screen, the overlay screen adapted to display a preview of a decision point.

44 Claims, 9 Drawing Sheets

OTHER PUBLICATIONS

Ahuja, R., et al., "Faster Algorithms for the Shortest Path Problem", *Journal of the Association for Computing Machinery, 37*(2), pp. 213–223, (1990).

Cung, V., et al., "An Efficient Implementation of Parallel A *", *CFPAR*, Montreal, Canada, pp. 153–167, (1994).

Fredman, M., et al., "Fibonacci heaps and their uses in improved network optimization algorithms", *Journal of the ACM, 34*(3), 2 pages, (1987).

Fu, L., "Heuristic Shortest Path Algorithms and their Potential IVHS Applications", *Proceedings of the Fourth University of Alberta—University of Calgary, Joint Graduate Student Symposium in Transportation Engineering*, pp. 83–109, (1995).

Ikeda, T., et al., "A Fast Algorithm for Finding Better Routes by AI Search Techniques", *Vehicle Navigation and Information Systems Conference Proceedings*, pp. 291–296, (1994).

Kaindl, H., et al., "Memory–Bounded Bidirectional Search", *Proceedings of the 12th National Conference on Art*, AAAI Press, Seattle, WA, pp. 1359–1364, (1994).

Laporte, G., "The Vehicle Routing Problem: An overview of exact and approximate algorithms", *European Journal of Operational Research, 59*, pp. 345–358, (1992).

Myers, B., "Data Structures for Best–First Search"http://www4.ncsu.edu/jbmyers/dsai.htm, pp. 1–6, (1997).

Ronngren, R., et al., "Parallel and Sequential Priority Queue Algorithms", *ACM Transactions on Modeling and Computer Simulation, 7*(2), pp. 168–172,198,199, (1997).

Stout, B., "Smart Moves: Intelligent Pathfinding", *Gamasutra*, http://www.gamasutra.com/features/programming/080197/pathfinding.htm, pp. 1–11, (1997).

Wai, L., et al., "Comparative Study of Shortest Path Algorithm for Transport Network", *USRP Report 2*, http://www.comp.nus.edu.sg/leonghoe/USRPreport–txt.html, pp. 1–10, (1999).

Zhan, F.B., "Three Fastest Shortest Path Algorithms on Real Road Networks: Data Structures and Procedures", *Journal of Geographic Information and Decision Analysis, 1*(1), http://www.geog.uwo.ca/gimda/journal/voll.1/Zhan/Zhan.htm, 11 pages, (1997).

Zhao, Y., et al., "An Adaptive Route–Guidance Algorithm for Intelligent Vehicle Highway Systems", *American Control Conference, Boston, MA*, Department of Electrical Engineering and Computer Science, The University of Michigan, pp. 2568–2573, (1991).

* cited by examiner

NAVIGATION SYSTEM, METHOD AND DEVICE WITH AUTOMATIC NEXT TURN PAGE

CROSS REFERENCE TO RELATED APPLICATIONS

This application is related to the following co-pending, commonly assigned U.S. patent applications: "Navigation System, Method and Device with Voice Guidance," Ser. No. 10/029,732 which are filed on even date herewith and each of which disclosure is herein incorporated by reference.

FIELD OF THE INVENTION

The present invention relates generally to navigational devices, and in particular to navigational devices with an automatic next turn page.

BACKGROUND OF THE INVENTION

Route planning devices are well known in the field of navigational instruments. The method of route planning implemented by known prior art systems depends on the capabilities of system resources, such as processor speed and the amount and speed of memory. As increased system capability also increases system cost, the method of route planning implemented by a navigation device is a function of overall system cost.

One feature of increased system capability cost involves the amount of assistance provided at decision points. Many conventional navigational devices simply do not incorporate added assistance at decision points. Thus, as a user of such a device may often get turned around or confused in unfamiliar territory. This is complicated by the fact that the circumstances such as traffic conditions, such as highway or inner city traffic conditions, often do not allow a user to pause and carefully consider a course of action at the decision point.

Conventionally, commercial auto clubs such a AAA® provide instructions for a course of action at various decision points, but without any real time added guidance or assistance for the same. Typically, the recipient of these services is provided with a set of paper maps, some even highlighting the route. However, the individual navigating the route must repeatedly flip through and study these maps before their travel and again in route. Extra attention must be given to these maps when the traveler reaches decision points in their journey. This places the user back in a compromising position when in heavy traffic conditions, as mentioned above. Even more, without self initiated independent study, the user is not provided with any sort of advance notice or warning for when these decision points are approaching. Thus, without careful planning the user can easily miss the decision point or not afford themselves with enough advance notice to be in the right position to navigate a course through the decision point.

On line map services such as MapQuest® provide similar sets of instructions for a course of action at decision points along a route, but again without any real time added guided or assistance for the same. The users of these systems also print out paper maps which they must flip through and in a self initiated independent fashion negotiate.

Finally, some navigation devices may attempt to provide a user with navigational aids for decision points while traversing a planned route. However, these systems, particularly low cost free standing navigation systems, limit such assistance to precanned bitmaps of symbols. For example, these systems may provide a turn arrow symbol indicating a direction to take at a decision point. While precanned bitmap navigational aids may be helpful in some instances, they generally do not provide enough instructional aid to a user in unfamiliar surroundings, particularly in a congested network of thoroughfares. Moreover, these devices do not provide any added assistance to negotiate among the many courses of action which match the instruction of the precanned bitmap symbol in a crowded network of thoroughfares. In other words, a left turn arrow symbol does not assist a user to understand which of several immediately approaching left turns to take.

In summary, existing navigation devices do not provide user intuitive assistance at decision points along a route. Thus, a user of these navigational aids may frequently find themselves missing decision points altogether, or not being in a correct position to navigate a course through an upcoming decision point. As such a user who is unsure about an upcoming decision may have to halt their travel to decipher the ambiguity. Clearly, in many cases halting travel is not a viable alternative. For example, when the user is traveling on an interstate it is entirely impossible to simply stop. The alternative of pulling off on the shoulder is undesirable and can be dangerous. Pulling off on an exit is equally undesirable since doing so increases travel time and provides an added inconvenience to the user. In other instances, such as navigating downtown city streets, the traffic issues alone may prevent the user from stopping their vehicle during the recalculation process. Even if the user has the ability to safely stop their vehicle, such as when traveling in a neighborhood, the inconvenience factor is present. Moreover, when the user entirely misses the decision point the headache and frustration of navigating their route is compounded, leaving the user to further resolve how to back track and again attempt to negotiate the missed decision point.

Current prior art systems have created a spectrum of products in which the degree of navigational accuracy is dictated primarily by the cost of the system. The lower cost systems currently offer a low degree of accuracy that is often inadequate for users. Therefore, there exists a need for a navigational route planning device which is more efficient and accurate than current low cost systems, without requiring more expensive system resources. In addition, there is also a need for a navigational route planning device which provides more understandable, accurate and timely assistance for negotiating decision points along a route.

SUMMARY OF THE INVENTION

The above mentioned problems of navigational devices are addressed by the present invention and will be understood by reading and studying the following specification. Systems and methods are provided for a navigational route planning device which is more efficient and accurate than current low cost systems, without requiring the more expensive system resources. The systems and methods of the present invention offer an improved navigational route planning device which provides more understandable, accurate and timely assistance for negotiating decision points along a route.

In one embodiment of the present invention, an electronic navigational aid device with a next turn page is provided. The navigational aid device includes a processor adapted to communicate with a memory. The memory has cartographic data and a route to a desired destination stored therein. The cartographic data includes data indicative of thoroughfares of a plurality of types. A display is provided which is adapted to communicate with the processor and the memory and which is capable of displaying the cartographic data. The device processes travel along the route. The device recognizes when the device is approaching a decision point in the route and provides to the display an overlay screen on top of any presently displayed screen, the overlay screen adapted to display a preview of a decision point with accurate geographic detail and other cues.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to navigational systems and devices having automated next turn page capabilities. One type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
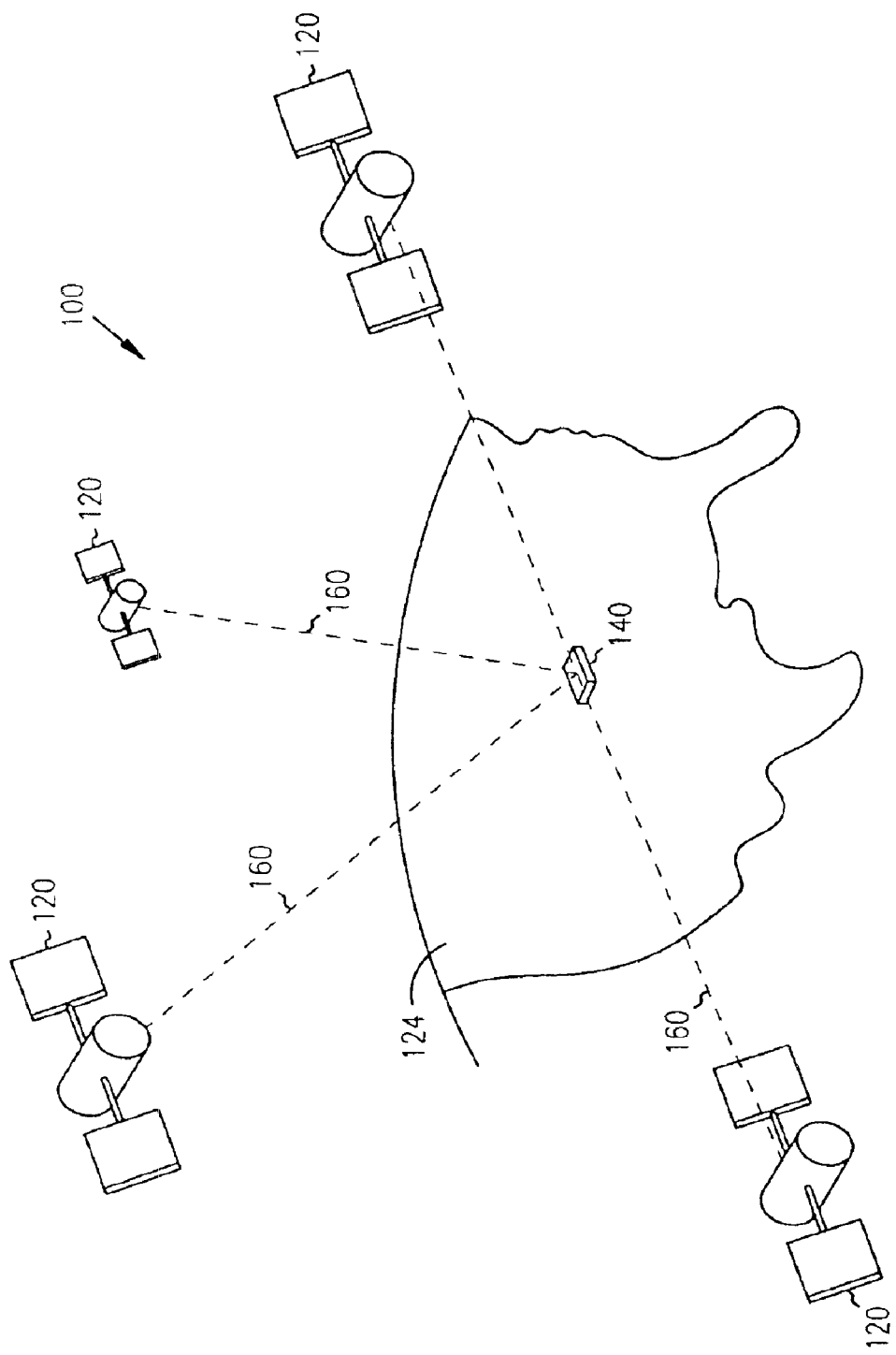
FIG. 1 is a representative view of a Global Positioning System (GPS)

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2A:
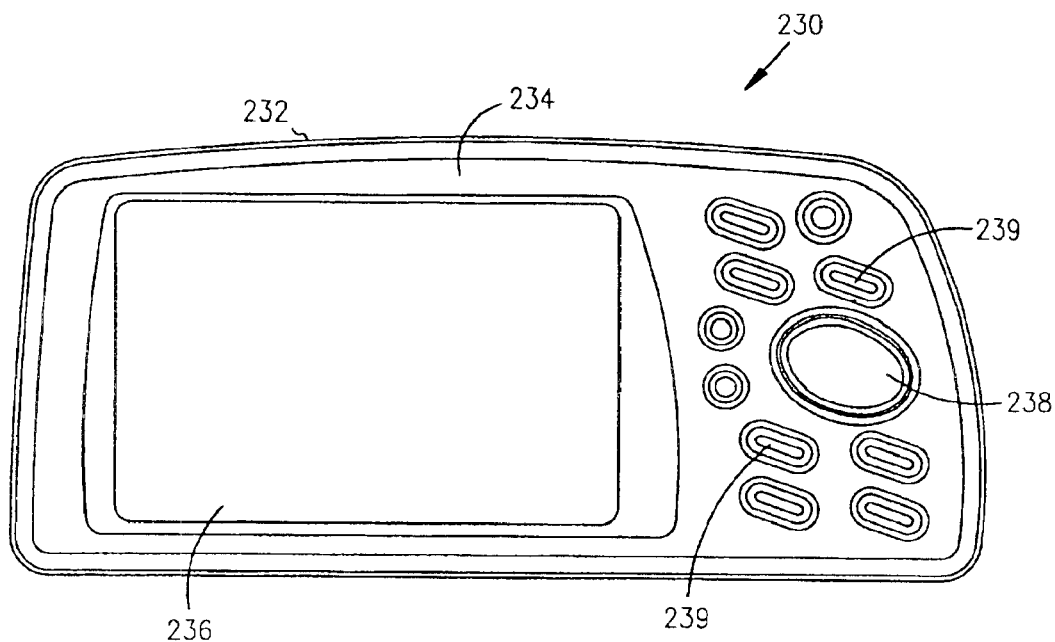
FIGS. 2A and 2B illustrate views for one embodiment of an electronic navigational device according to the teachings of the present invention.
Figure 2B:
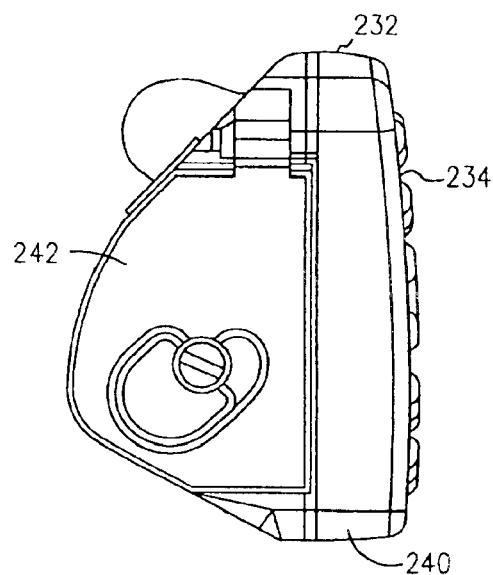

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited. Audio information can likewise be provided in one embodiment.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

Figures 3A, 3B:
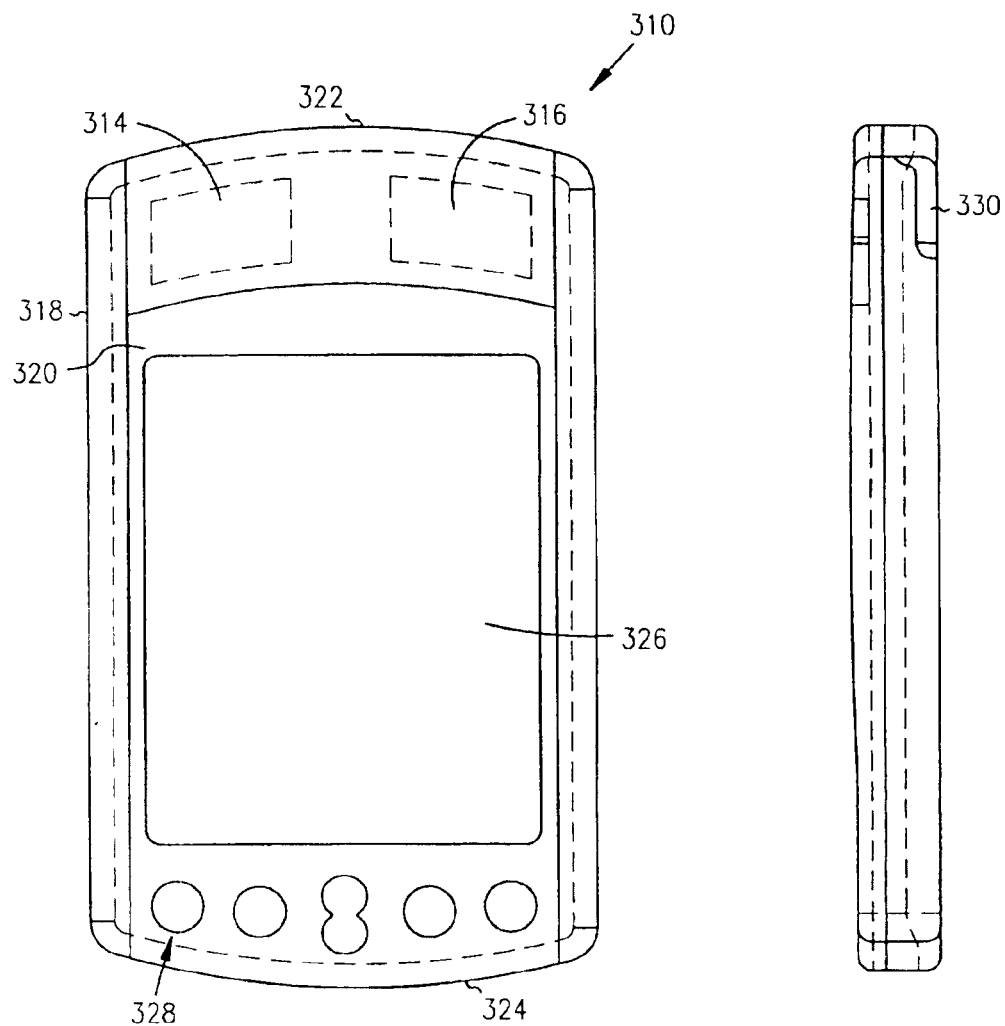
FIGS. 3A–3C illustrate views for another embodiment of an electronic navigational device according to the teachings of the present invention.
Figure 3C:
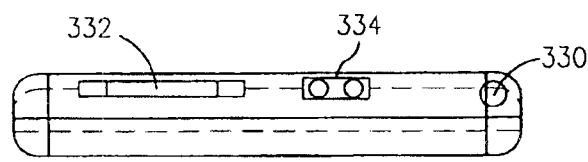

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
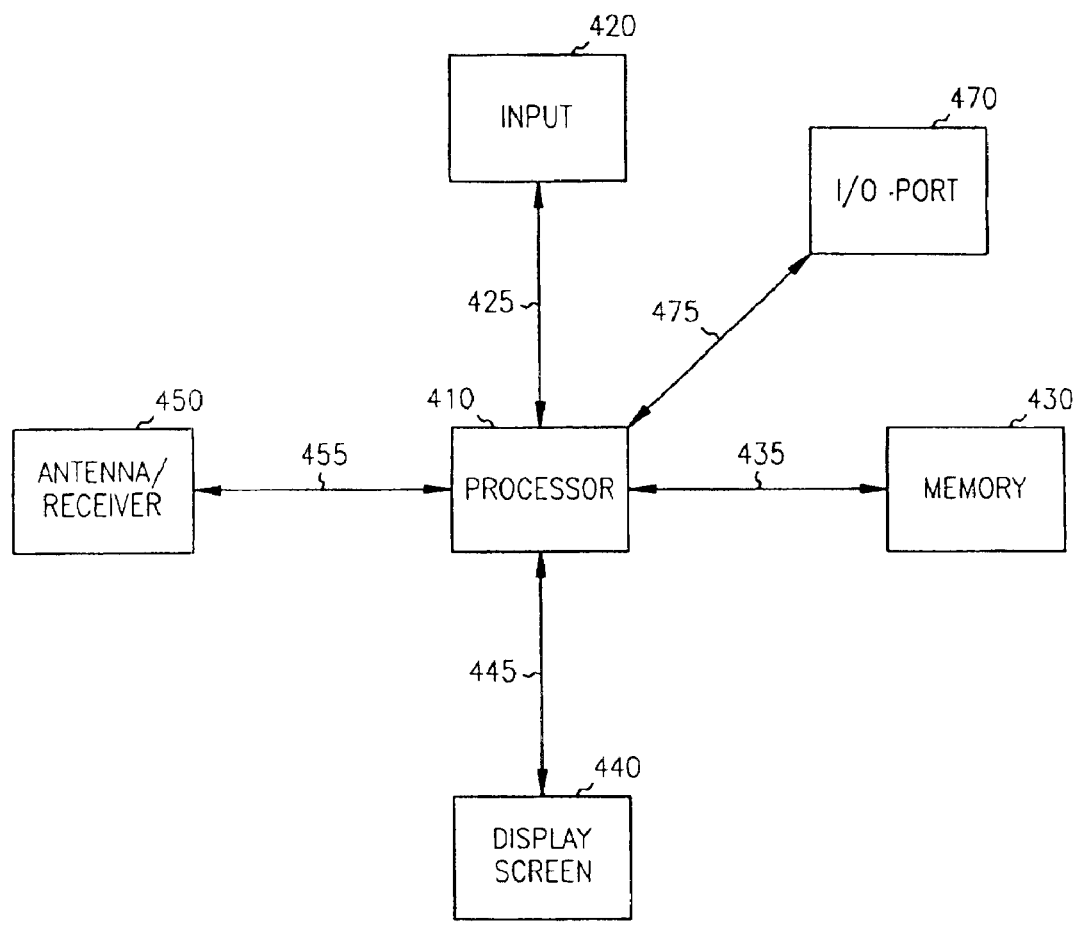
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 232 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components further include I/O ports 470 connected to processor 410 via line 475.

Figure 4B:
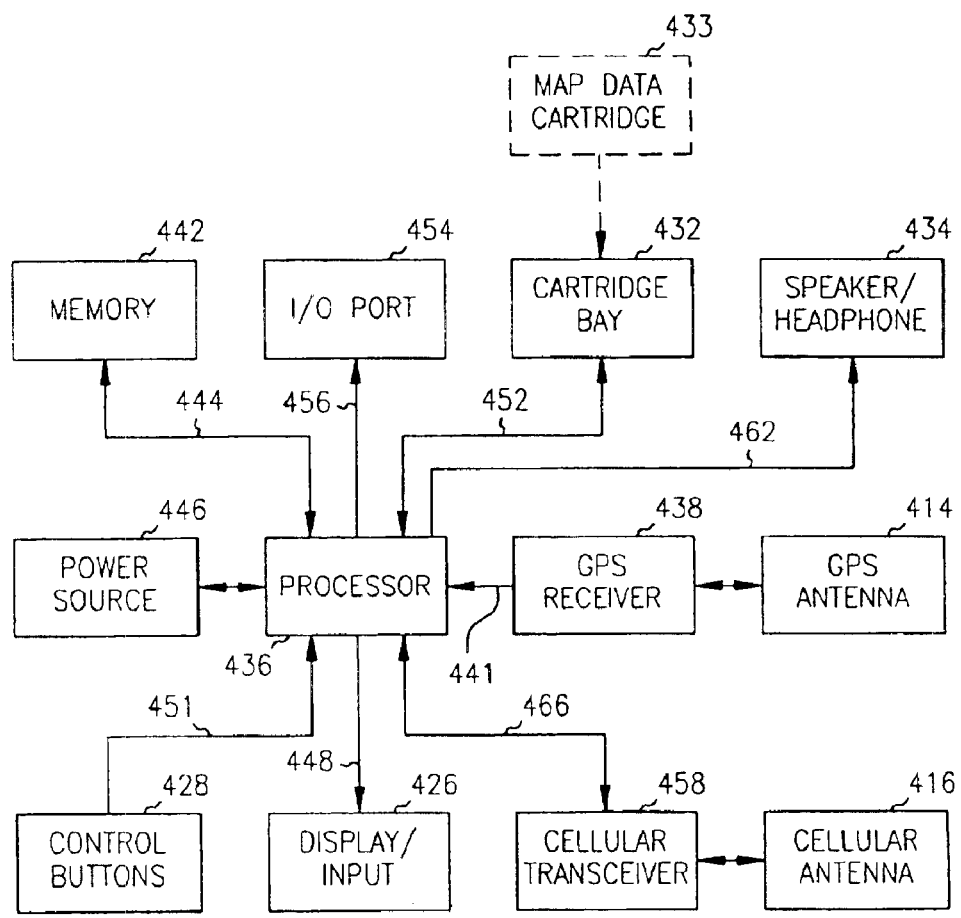
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

Using the processing algorithms of the present invention, the device processes travel along the route. Using the processing algorithms and the cartographic data and planned route stored in memory, the device recognizes when the device is approaching a decision point in the route and provides to the display an overlay screen on top of any presently displayed screen. The overlay screen is adapted to display a preview of a decision point with accurate geographic detail and other cues. According to the teachings of the present invention, the device incorporates these and other functions as will be explained in more detail below in connection with FIGS. 6–8.

Figure 5:
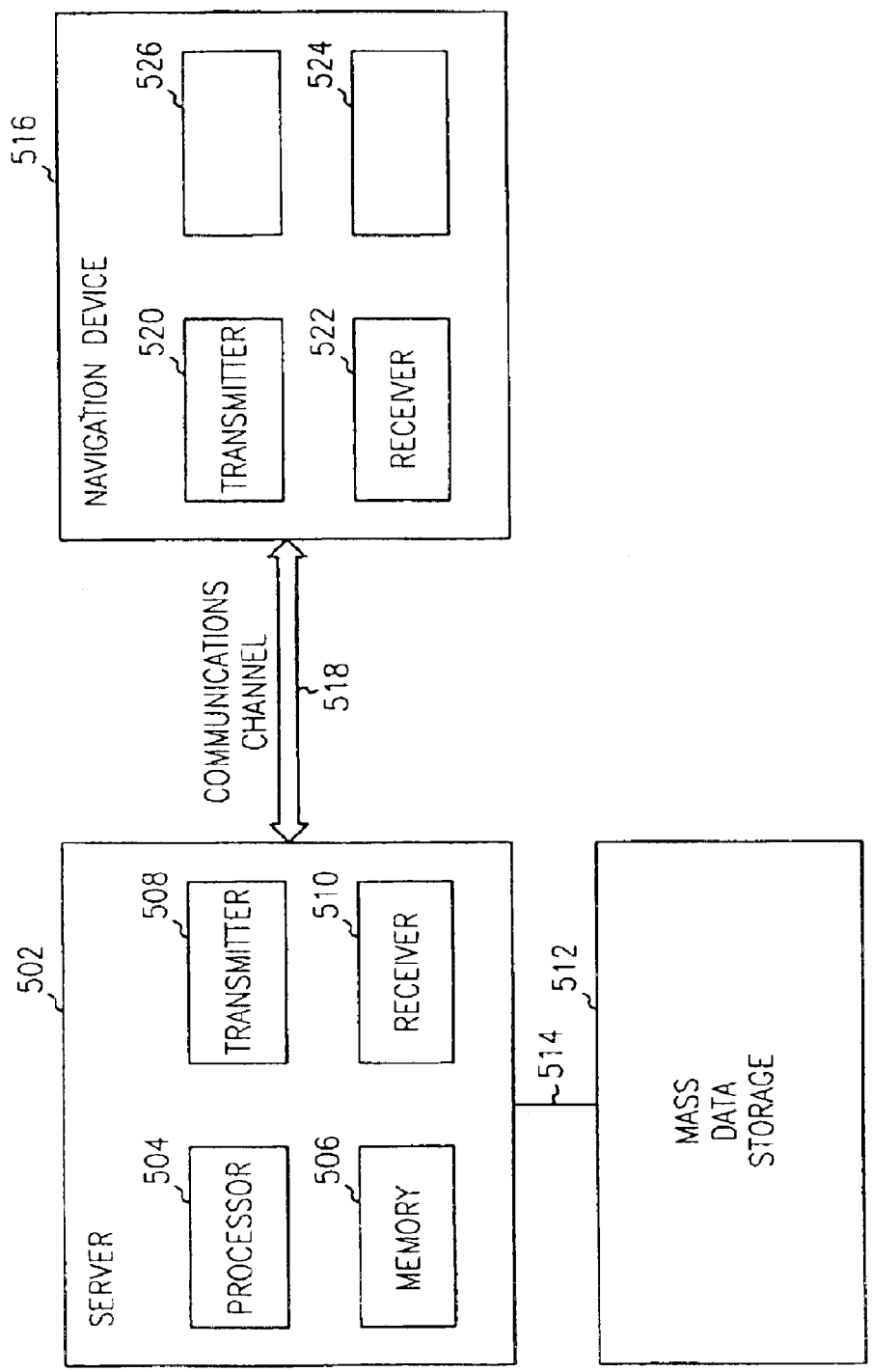
FIG. 5 is a block diagram of a navigation system according to the teachings of the present invention.

FIG. 5 is a block diagram of an embodiment of a navigation system which can be adapted to the teachings of the present invention. The navigation system includes a server 502. According to one embodiment, the server 502 includes a processor 504 operably coupled to memory 506, and further includes a transmitter 508 and a receiver 510 to send and receive data, communication, and/or other propagated signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be separate device from the server 502 or can be incorporated into the server 502.

In one embodiment of the present invention, the navigation system further includes a navigation device 516 adapted to communicate with the server 502 through the communication channel 518. According to one embodiment, the navigation device 516 includes a processor and memory, as previously shown and described with respect to the block diagram of FIG. 4. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency and infrared communication, and the like. Additionally, according to various embodiments, the communication channel 516 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory, such as now known or hereinafter developed.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

FIG. 5 presents yet another embodiment for a collective set of electronic components adapted to the present invention. As one of ordinary skill in the art will understand upon reading and comprehending this disclosure, the navigation system of FIG. 5 is adapted to the present invention in a manner distinguishable from that described and explained in detail in connection with FIG. 4.

That is, the navigational system 500 of FIG. 5 is likewise adapted to provide an electronic navigational aid device 516 with instructional aids to assist in negotiating a course through a decision point in a route. In this embodiment, the processor 504 in the server 502 is used to handle the bulk of the system's processing needs. The mass storage device 512 connected to the server can include volumes more cartographic and route data than that which is able to be maintained on the navigational device 516 itself. In this embodiment, the server 502 processes the majority of a device's travel along the route using a set of processing algorithms and the cartographic and route data stored in memory 512 and can operate on signals, e.g. GPS signals, originally received by the navigational device 516. Similar to the navigational device of FIG. 4, the navigation device 516 in system 500 is outfitted with a display 524 and GPS capabilities 526.

As described and explained in detail in connection with FIG. 4, the navigation system of FIG. 5 uses processing algorithms to process travel along a route. The processor 504 operates on algorithms and the cartographic data and planned route stored in memory 506. Using the novel processing algorithms and the cartographic data and planned route stored in memory 506, the device recognizes when the device is approaching a decision point in the route and creates an overlay screen which can be provided to the display on top of any presently displayed screen. The overlay screen created by the servers is adapted to display a preview of a decision point with accurate geographic detail and other cues. According to the teachings of the present invention, the device incorporates these and other functions as will be explained in more detail below in connection with FIGS. 6–8. As one of ordinary skill in the art will understand upon reading and comprehending this disclosure, a user of the navigation device 516 can be proximate to or accompanying the navigation device 516. The invention however, is not so limited. The navigation device 516 of the present invention includes a portable electronic navigational aid device.

The features and functionality explained and described in detail above in connection with the device of FIG. 4 are likewise available in the system 500 of FIG. 5. That is, as will be explained in more detail below, in one embodiment the navigation device 516 further provides audio and visual cues to aid the navigation along the route.

Figure 6:
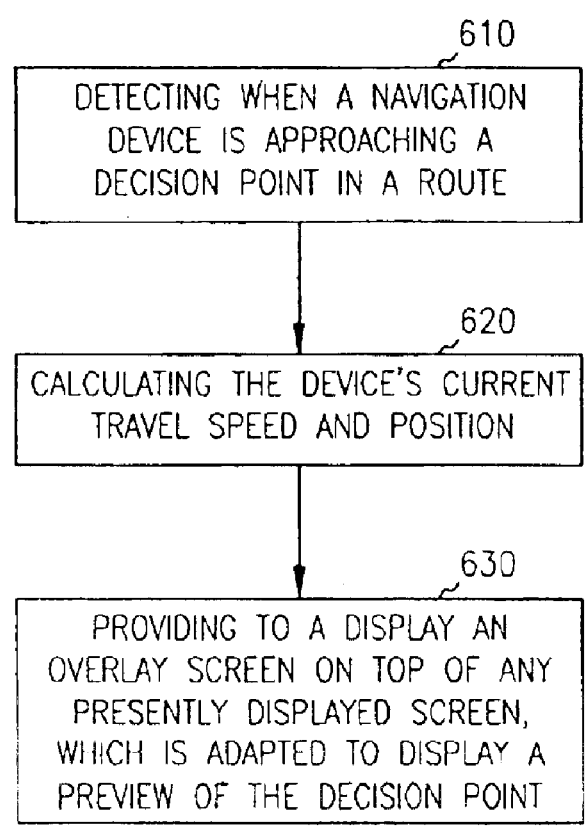
FIG. 6 is a flow diagram of one embodiment of a navigation aid method according to the teachings of the present invention.

FIG. 6 is a flow diagram of one embodiment of a navigation aid method according to the teachings of the present invention. The navigation aid method includes a method for providing an overlay screen on top of any presently displayed screen, the overlay screen adapted to display a preview of a decision point with accurate geographic detail and other cues within a navigation device or navigation system as described and explained in detail above in connection with FIGS. 4 and 5. And, as described above, a processor is used for processing signals which include input data from input devices, e.g. keypads or other input keys, GPS signals from GPS components, and data received from I/O ports in order to perform the methods described herein. As shown in FIG. 6, the navigation aid method for providing a preview of a decision point with accurate geographic detail includes detecting when a navigation device is approaching a decision point in a route as shown in block 610. The method includes calculating the device's current travel speed and position at block 620. In one embodiment, calculating the device's current travel speed and position includes using a global positioning system. At block 630, the method further includes providing to a display an overlay screen on top of any presently displayed screen, the overlay screen adapted to display a preview of a decision point. According to the teachings of the present invention, providing the overlay screen includes providing in the overlay screen cartographic data accurately depicting a geographic detail of the decision point. In one embodiment of the invention, the display continuously displays the device's position and uses audio instructions to navigate along the route as well as through a course at the decision point.

In one embodiment, providing the geographic-detail includes providing the geographic detail in a dynamic magnified display scale, in comparison to a display scale of the presently displayed screen, based on a road classification for a thoroughfare on which the device is currently traveling. In one embodiment, providing the geographic detail includes providing the geographic detail with a highlighted portion indicating a course to follow through the decision point. In one embodiment, providing the geographic detail includes providing a marker centered at the decision point.

As one of ordinary skill in the art will understand upon reading and comprehending this disclosure, any one or more of the above features can be combined into a particular embodiment of the invention. Likewise, in the invention any one or a combination of the above functions can be optionally de-activated in the device. One of ordinary skill in the art will further understand that the method includes a using a computer accessible medium having a set of computer executable instructions operable to perform the method.

In one method embodiment of the present invention, the device operates on data indicative of a set of travel habits of the device on each of the plurality of types of thoroughfares and stores the travel habit data in the memory. In one embodiment of the present invention, the travel habit data includes data relating to the thoroughfare classification, the speed classification of the thoroughfare, the time of day, and the historical travel speed of the device on the particular thoroughfare. In the invention, the device calculates the device's current position at regular intervals. That is, the device calculates the device's current position continuously. The display provides continuously displays a device's position and uses audio instructions to navigate to the route as well as to navigate a course through a decision point along the route. Again, in one embodiment, the device can continuously provide the device's current travel speed and location using a global positioning system.

The device of the present invention includes a portable electronic navigational aid device. In one embodiment, the portable electronic navigation aid device includes a portable vehicle, or automobile navigation device, a navigational device for marine craft, aircraft, portable handheld units, and others of the like.

Figure 7:
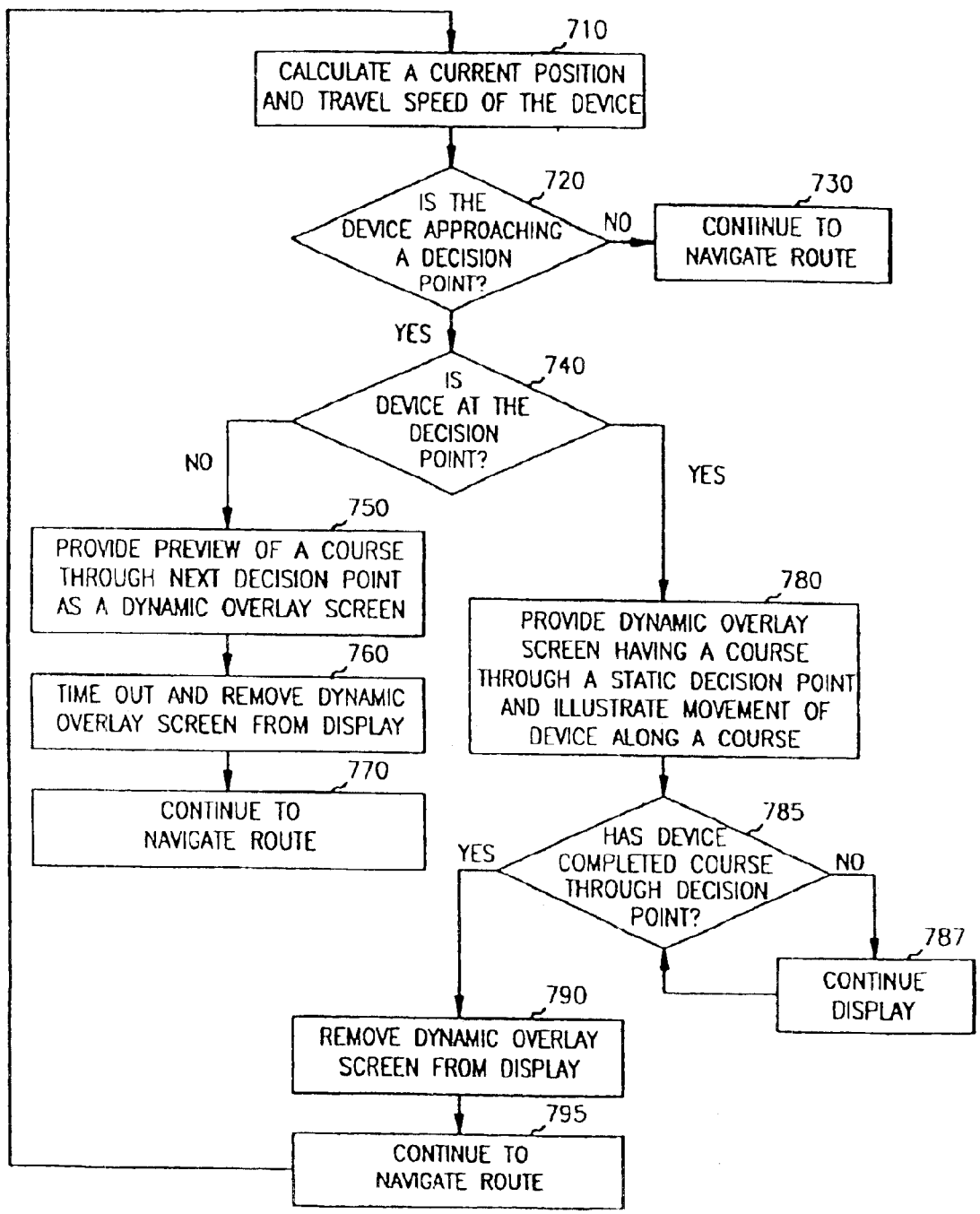
FIG. 7 is a flow diagram of another embodiment of a navigation aid method according to the teachings of the present invention.

FIG. 7 is a flow diagram of another embodiment of a navigation aid method according to the teachings of the present invention. The navigation aid method includes a presently displayed, default, or regularly displayed screen displaying cartographic data and a route to navigate from a beginning position to a desired destination, the cartographic data including data indicative of thoroughfares of a plurality of types, the route including a number of decision points. In the invention, this screen can be referred to as the map screen or navigation screen. However, the invention is not limited to the same and any number of additional navigational aid screens can be provided on the display screen as the same will be understood by one of ordinary skill in the art upon reading and comprehending this disclosure. In the method, the display is in communication with a processor and memory and is operable for displaying the cartographic data, the route to the desired destination, and the device's position on the presently displayed screen.

The navigation aid method includes a method for providing an overlay screen on top of any presently displayed screen. In the method, the overlay screen is adapted to display a preview of a decision point with accurate geographic detail and other cues within a navigation device as described and explained in detail above in connection with FIGS. 4 and 5. And, as described above, a processor is used for processing signals which include input data from user input devices, e.g. keypads or other input keys, GPS signals from GPS device/system components, and data received from I/O ports in order to perform the methods described herein.

In FIG. 7, the navigation aid method for providing a preview of a decision point with accurate geographic detail includes using a processor in communication with a memory to operate on one or more route processing algorithms. A display is provided, as described in detail above, in communication with the processor and capable of displaying the cartographic data, the route to the desired destination, and the device's position. As described above, the device processes travel along the route and provides location data to the display. In the method, the device recognizes when the device is approaching a decision point in the route and provides to the display an overlay screen on top of any presently displayed screen. This is sometimes termed as a screen in screen, or picture in picture display. As shown in block 710, the method includes calculating a current position and travel speed of the device. The method includes determining whether the device is approaching a decision point at block 720. In the present invention, determining whether the device is approaching a decision point includes determining if a set of criteria have been met for timing when a preview of the decision point will be provided in an overlay screen. According to the teachings of the present invention, the set of criteria include, but are not limited to, how proximate the device is to the decision point and how quickly the device is approaching the decision point, e.g. how fast the device is traveling. For example, in one embodiment of the invention, the device provides a preview of the decision point at some predetermined time window before the device reaches the decision point, e.g. 30–90 seconds before the device reaches the decision point. In the invention, the device determines this time window based on a set of criteria such as a classification of the thoroughfare on which the device is traveling, a speed classification of the thoroughfare on which the device is traveling, and a current travel speed of the device.

To further explain, in one embodiment, the device analyzes or assesses the speed classification of the thoroughfare on which the device is traveling and a current travel speed of the device to determine the point in time in advance of the decision point to display the overlay screen previewing the decision point. Thus, for example, if the device is traveling on a major interstate at a high rate of speed, then the device will provide the overlay screen previewing the next decision point at a time approximated to be about 90 seconds in advance of reaching the decision point in order to provide enough advance warning for the device to position itself correctly to be able to negotiate a course through the decision point when it arrives. Alternatively, if the device is traveling on a minor thoroughfare at a low rate of speed, then the device will provide the overlay screen previewing the next decision point at a time approximately 30 seconds in advance of reaching the decision point, again in order to provide enough advance warning for the device to position itself correctly to be able to negotiate a course through the decision point yet still be proximate enough in time to the decision point to provide the most effective navigation assistance. Additional navigation assistance can be provided as described in co-pending, commonly assigned U.S. patent application, entitled "Navigation System, Method and Device with Voice Guidance," Ser. No. 10/029,732, which is filed on even date herewith and which disclosure is herein incorporated by reference.

If the device is not approaching a decision point, the method proceeds to block 730 and continues to navigate the route. As shown in FIG. 7, the method includes returning to block 710 to regularly calculate a current position and travel speed of the device and further returning to block 720 to repeatedly assess if the device is approaching a decision point in the route.

If the device is approaching a decision point, the method determines if the device is at or upon the decision point at block 740 as described above. In one embodiment, if the device is approaching a decision point the device provides a tone to provide a warning or indication of the same. As one of ordinary skill in the art will understand upon reading this disclosure, the tone can be adapted to suit the needs of a particular device implementation. That is, in some implementations the tone is desirable in order to increase the navigational assistance of the device and alert a user in a manner which minimizes a user's interaction or focus on the device. In an alternative embodiment, as described in more detail in copending, commonly assigned application Ser. No. 10/029,732, entitled "Navigation System, Method and Device with Voice Guidance," the device communicates audio instructions to a user to increase the navigational assistance and minimize a user's interaction or focus on the device.

If the device is not yet at the decision point, but is proximate enough to trigger the overlay screen providing a preview of the decision point, then the method proceeds to block 750. In block 750, the device provides a preview of a course through the next decision point as a dynamic overlay screen, picture in picture screen, pop-up screen or the like, over any presently displayed screen. In the invention, the dynamic overlay screen includes the dynamic functionality described in more detail below.

According to the teachings of the present invention, when the overlay screen is provided in advance of next decision point, the overlay screen can provide geographic detail of a course through the decision point even though that cartographic detail is not shown on the presently displayed underlying screen. As will be understood by one of ordinary skill in the art upon reading and understanding this disclosure, the method of the invention further facilitates an advance preview of any number of decision points along a route which can be called up as an overlay screen, as described herein, in any order or at any time based on the device receiving an appropriate call up input signal.

In block 760, the method includes timing out the display of the overlay screen to return the full display to the underlying display screen. In one embodiment, by way of example and not by way of limitation, the device times out the display of the overlay screen after 10 seconds. As one of ordinary skill in the art will understand upon reading and comprehending this disclosure the time-out functionality can be adjusted to suit a particular device implementation and the overlay screen can further be removed more quickly upon receiving a remove input signal. Upon time-out, the device returns the display to a full screen display of the underlying screen, which can be the map screen or any other navigation aid screen, as the same will be known and understood by one of ordinary skill in the art, and continues navigating the route in block 770. Thus, in one embodiment, the display screen is returned in block 770 to the map screen and once again displays the actual location of the device on a cartographic display of the route.

According to the teachings of the present invention, the method will return to block 740 to analyze, assess or determine if the device has reached the decision point. When the answer is yes, e.g. the device has reached the decision point, then the method proceeds to block 780 and provides a dynamic overlay screen having a course through the decision point. In one embodiment of this overlay screen, the overlay screen includes a static display of the geographic detail of the course through the decision point and dynamically displays the device's movement as the device negotiates through the decision point. The same is shown in more detail in FIG. 8. In this embodiment, the decision point is centered in the overlay screen. In this embodiment, resources of the device can be conserved since the device does not have to continually process redrawing the geographic detail in the overlay map as a track-up orientation, as the same will be understood by one of ordinary skill in the art, during negotiation of the device through the course at the decision point. In an alternative embodiment, according to the teachings of the present invention, the overlay screen includes a dynamic moving map display of the geographic detail of the course through the decision point having the location or position of the device centered in the overlay screen. The invention is not so limited.

Next, in block 785 the method determines, analyzes, or assesses whether the device has completed the course through the decision point. If the device has not completed the course through the decision point the overlay screen remains displayed as shown in block 787. That is, in the invention, the overlay screen having geographic detail of a course through the decision point is provided to the display until the device has successfully negotiated the course through the decision point. Once, the device has successfully navigated through the decision point, the method proceeds to block 790 and removes the overlay screen to return the full display to the underlying display. At block 795, the device continues to navigate the route, proceeding through the sequence described above, e.g. returning to block 710 to continuously calculate a current position and travel speed of the device.

As one of ordinary skill in the art will understand upon reading and comprehending this disclosure, the overlay screen displays actual, true to life, cartographic data to represent a course of action to follow through a decision point. That is, the overlay screen accurately displays cartographic data representing the true layout of the route, e.g. the shape and topography of a roadway network. This is in contrast to an overlay screen which simply provides a precanned bitmap image of instructional symbols. As one of ordinary skill in the art will understand upon reading and comprehending this disclosure, such precanned, bitmap instructional symbols often provide poor correlation to the true course of action necessary in the real life decision point along a route and can provide frustration and confusion to a user of the device when faced with multiple courses of action in a network of thoroughfares which could equally correspond to the precanned symbol.

Figure 8:
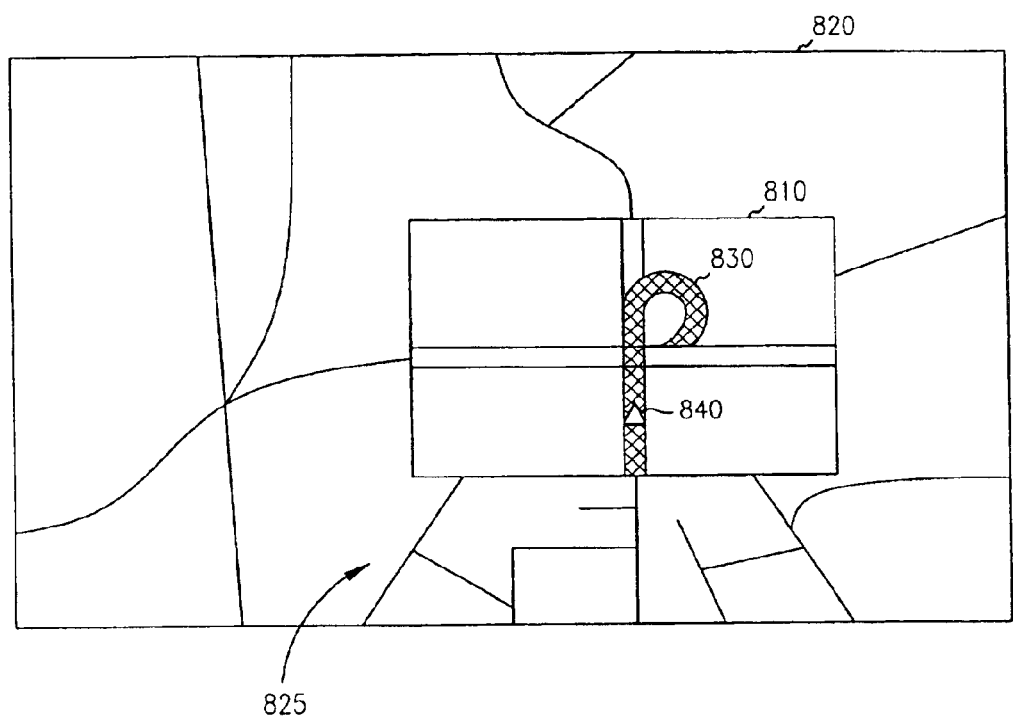
FIG. 8 is a diagram illustrating an overlay screen, on a display of cartographic data, providing a select set of geographic detail for negotiating a course through a decision point in a route according to one embodiment of the present invention.

FIG. 8 is a diagram illustrating an overlay screen 810, on a display of cartographic data 820, providing a select set of geographic detail for negotiating a course 830 through a decision point in a route according to one embodiment of the present invention. In the embodiment shown in FIG. 8, the full display screen 820 includes a presently displayed, default, or regularly displayed screen displaying cartographic data and a route to navigate from a beginning position to a desired destination, the route including a number of decision points. In the invention, this screen can be referred to as the map screen or navigation screen 820. However, the invention is not limited to the same and any number of additional navigational aid screens can be provided on the display screen as the same will be understood by one of ordinary skill in the art upon reading and comprehending this disclosure. In the embodiment shown in FIG. 8, the cartographic data including data indicative of thoroughfares of a plurality of types 825.

As shown in FIG. 8, the geographic detail in the overlay screen 810 for negotiating a course includes a geographic detail provided on a magnified display scale in comparison to a display scale of the presently displayed screen, or underlying screen 820. In one embodiment, according to the teachings of the present invention, the magnified display scale is a dynamic display scale based on a road classification for a thoroughfare on which the device is currently traveling. As will be understood by one of ordinary skill in the art upon reading and comprehending this disclosure, in one embodiment the geographic detail in the overlay screen 810 includes geographic detail not shown on the presently displayed screen 820, such as when the overlay screen 810 is providing an advance preview of an upcoming decision point.

According to the teachings of the present invention, the device always dynamically provides the overlay screen 810 to the display when the device is at the decision point. As described above, in one embodiment, the geographic data in the overlay screen 810 is static with the decision point centered in the overlay screen and the device dynamically displays a movement of the device, shown at 840 on the course 830 through the decision point. As described above, the device can provide the overlay screen 810 to the displayed for a fixed amount of time as suited to a particular device implementation. As described above, the device is operable to provide in an overlay screen 810, the geographic detail of any decision point along the route upon receiving a preview request signal regardless of a content of the presently displayed screen.

In the invention, the device is adapted to remove insignificant detail from the geographic detail at the decision point based on a set of criteria. In one embodiment, the set of criteria includes any one or any combination of the following; whether a cartographic detail is a thoroughfare, and whether a nearby thoroughfare in the cartographic data intersects with a thoroughfare on which the device is currently traveling. However, the invention is not so limited. That is in one embodiment, the device removes all geographic detail such as ponds, lakes, and other geographic detail of the like which are not thoroughfares. In one embodiment, the device further removes all thoroughfares from the geographic detail which are thoroughfares that do not intersect the thoroughfare on which the device is currently traveling. That is the thoroughfare does not intersect at a node such that the device can turn onto that adjacent thoroughfare. In another embodiment, the device removes adjacent thoroughfares from the geographic detail, but leaves thoroughfares in the geographic detail which intersect the thoroughfare on which the device is actually traveling whether or not the device can actually turn onto the intersecting thoroughfare. That is, the device includes thoroughfares in the geographic detail which intersect the thoroughfare on which the device currently traveling such as a thoroughfare which intersects as an underpass or overpass in a Z plane, as the same will be know an understood by one of ordinary skill in the art.

In one embodiment, the device removes, from the geographic detail, thoroughfares based on a set of adjacency criteria which includes, but is not limited to, a thoroughfares name, thoroughfare classification, speed classification of the thoroughfares, non-significant terrain detail, and other criteria of the like. As used herein, the term adjacency information, or adjacencies, is intended to include any thoroughfare which intersects the current thoroughfare on which the device is traveling. Every place two roads intersect is termed a node. Thus, every node on a given thoroughfare connects that thoroughfare to an adjacency, or adjacent thoroughfare.

In some embodiments, the methods provided above are implemented as a computer data signal embodied in a carrier wave or propagated signal, that represents a sequence of instructions which, when executed by a processor, such as processor 410 in FIG. 4 or processor 504 in FIG. 5, cause the processor to perform the respective method. In other embodiments, methods provided above are implemented as a set of instructions contained on a computer-accessible medium, such as memory 430 in FIG. 4 or mass storage device 512 in FIG. 5, capable of directing a processor, such as processor 410 in FIG. 4 or processor 504 in FIG. 5, to perform the respective method. In varying embodiments, the medium is a magnetic medium, an electronic medium, or an optical medium.

As one of ordinary skill in the art will understand upon reading this disclosure, the electronic components of device 400 shown in FIG. 4 and components of the system 500 shown in FIG. 5 can be embodied as computer hardware circuitry or as a computer-readable program, or a combination of both. In another embodiment, system 500 is implemented in an application service provider (ASP) system.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to improving accuracy, processor speed and ease of user interaction with a navigation device. That is, the systems, devices and methods provide for a navigational route planning device which is more efficient and accurate than current low cost systems, without requiring the more expensive system resources. The systems, devices and methods of the present invention offer an improved navigational route planning device which provide more understandable, accurate and timely assistance for negotiating decision points along a route.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. An electronic navigational aid device with an automatic next turn page, comprising:

a processor;

a memory adapted to communicate to the processor, the memory having cartographic data and a route to a desired destination stored therein, the cartographic data including data indicative of thoroughfares of a plurality of types;

a display adapted to communicate with the processor and the memory and capable of displaying the cartographic data;

wherein the device processes travel along the route;

wherein the device recognizes when the device is approaching a decision point in the route and provides to the display an overlay screen on top of any presently displayed screen, the overlay screen adapted to display a preview of the decision point, including a highlighted portion indicating a course to follow through the decision point, and the overlay screen displays motion of the device on the course through the decision point; and wherein insignificant detail is removed from the overlay screen at the decision point based on a set of criteria.

2. The device of claim 1, wherein the overlay screen includes cartographic data accurately depicting a geographic detail of the decision point.

3. The device of claim 2, wherein the geographic detail is provided on a magnified display scale in comparison to a display scale of the presently displayed screen.

4. The device of claim 3, wherein the magnified display scale is a dynamic display scale based on a road classification for a thoroughfare on which the device is currently traveling.

5. The device of claim 2, wherein the geographic detail includes the highlighted portion indicating the course to follow through the decision point.

6. The device of claim 2, wherein the geographic detail includes a marker centered at the decision point.

7. The device of claim 2, wherein the device operates on data indicative of a set of travel habits for the device on each of the plurality of types of thoroughfares and stores the travel habits in the memory.

8. The device of claim 1, wherein the device regularly calculates the device's current position.

9. The device of claim 1, wherein the display continuously displays the device's position and uses audio instructions to navigate along the route as well as through a course at the decision point.

10. An electronic navigational aid device with an automatic next turn page, comprising:

a processor;

a memory in communication with the processor, the memory having cartographic data and a route stored therein to navigate from a beginning position to a desired destination, the cartographic data including data indicative of thoroughfares of a plurality of types, the route including a number of decision points;

a display in communication with the processor and capable of displaying the cartographic data, the route to the desired destination, and the device's position;

wherein the device processes travel along the route and provides location data to the display;

wherein the device recognizes when the device is approaching a decision point in the mute and provides to the display an overlay screen on top of any presently displayed screen, the overlay screen adapted to display a preview of the decision point, the overlay screen including cartographic data accurately depicting a geographic detail of the decision point, the geographic detail including a highlighted portion indicating a course to follow through the decision point, and wherein the overlay screen displays motion of the device on the course through the decision point;

wherein the device is adapted to remove insignificant detail from the geographic detail at the decision point based on a set of criteria.

11. The device of claim 10, wherein the device dynamically provides the overlay screen to the display in advance of the decision point based on a set of criteria.

12. The device of claim 11, wherein the set of criteria includes any one or any combination of the following:

a classification of the thoroughfare on which the device is currently travelling;

a speed classification of the thoroughfare on which the device is currently travelling; and a speed at which the device is currently travelling.

13. The device of claim 10, wherein the geographic detail includes geographic detail not shown on the presently displayed screen.

14. The device of claim 10, wherein the device dynamically provides the overlay screen to the display when the device is at the decision point.

15. The device of claim 14, wherein the geographic data in the overlay screen is static with the decision point centered in the overlay screen and the device dynamically displays a movement of the device on a course through the decision point.

16. The device of claim 10, wherein the device provides the overlay screen to the display for a fixed amount of time.

17. The device of claim 10, wherein the device is operable to provide in an overlay screen, the geographic detail of any decision point along the route upon receiving a preview request signal regardless of a content of the presently displayed screen.

18. The device of claim 10, wherein the set of criteria includes any one or any combination of the following:

whether a cartographic detail is a thoroughfare; and whether a nearby thoroughfare in the cartographic data intersects with a thoroughfare on which the device is currently traveling.

19. A navigation aid method for negotiating decision points along a route, comprising:

detecting when a navigation device is approaching a decision point in a mute;

calculating the device's current travel speed and position;

providing to a display an overlay screen on top of any presently displayed screen, the overlay screen adapted to display a preview of the decision point with a highlighted portion indicating a course to follow through the decision point;

displaying motion of the device through the course on the overlay screen; and wherein insignificant detail is removed from the overlay screen at the decision point based on A set of criteria.

20. The method of claim 19, wherein providing the overlay screen includes providing in the overlay screen cartographic data accurately depicting a geographic detail of the decision point.

21. The method claim 19, wherein providing the geographic detail includes providing the geographic detail in a dynamic magnified display scale in comparison to a display scale of the presently displayed screen based on a road classification for a thoroughfare on which the device is currently traveling.

22. The method of claim 19, wherein providing the geographic detail includes providing the geographic detail with the highlighted portion indicating the course to follow through the decision point.

23. The method of claim 19, wherein the providing the geographic detail includes providing a marker centered at the decision point.

24. The method of claim 19, wherein calculating the device's current travel speed and position includes using a global positioning system.

25. The method of claim 19, wherein the display continuously displays the device's position and uses audio instructions to navigate along the route as well as through a course at the decision point.

26. The method of claim 19, wherein the method includes using a computer accessible medium having a set of computer executable instructions operable to perform the method.

27. A navigation system for negotiating a decision point along a route, comprising:

a server having a processor and memory, the memory having cartographic data and a route stored therein to navigate from a beginning position to a desired destination, the cartographic data including data indicative of thoroughfares of a plurality of types, the route including a number of decision points;

wherein the server includes executable instructions stored thereon, the processor operable on the executable instructions to:

process travel of a navigation device along the route and provide location data;

recognize an approaching decision point in the route;

trigger an overlay screen on the navigation device to display a preview of a decision point, the overlay screen including cartographic data accurately depicting a geographic detail of the decision point with a highlighted portion indicating a course to follow through the decision point, and the overlay screen displaying motion of the navigation device on the course through the decision point; and wherein insignificant detail is removed from the geographic detail at the decision point based on a set of criteria.

28. The navigation system of claim 27, wherein the system further includes:

a display in communication with the processor and capable of displaying the cartographic data, the route to the desired destination, the device's position, and the overlay screen on top of any presently displayed screen; and a navigation device adapted to communicate with and retrieve navigation data from the server via a communication channel, wherein the navigation device includes a display adapted to display the overlay screen on top of any presently displayed screen.

29. The navigation system of claim 28, wherein the communication channel includes a wireless channel.

30. The navigation system of claim 28, wherein the system further includes a mass data storage adapted to store navigation data.

31. The navigation system of claim 28, wherein the server includes processor adapted to respond to a request from the navigation device by performing calculations on the navigation data and transmitting results to the navigation device.

32. The navigation system of claim 28, wherein the navigation device adapted to communicate with and retrieve navigation data from the server using cellular communication technology.

33. The navigation system of claim 27, wherein the set of executable instructions further include instructions for:
   determining data indicative of a set of travel habits for a navigation device on each of the plurality of types of thoroughfares; and
   storing the travel habit date in the memory.

34. The navigation system of claim 27, wherein the set of executable instructions further include instructions for regularly calculating a navigation device's current position.

35. The navigation system of claim 27, wherein the set of executable instructions further include instructions for dynamically providing the overlay screen in advance of the decision point based on a set of criteria, wherein the set of criteria includes any one or any combination of the following:
   a classification of the thoroughfare on which the device is currently traveling;
   a speed classification of the thoroughfare on which the device is currently traveling; and
   a speed at which the device is currently traveling.

36. The navigation system of claim 35, wherein the geographic detail includes geographic detail not shown on the presently displayed screen.

37. The navigation system of claim 27, wherein the set of executable instructions further include instructions for dynamically providing the overlay screen when a navigation device is at the decision point.

38. The navigation system of claim 27, wherein the set of executable instructions further include instructions for:
   dynamically providing the overlay screen wherein the geographic data in the overlay screen is static with the decision point centered in the overlay screen; and
   dynamically displaying in the overlay screen a movement of a navigation device on a course through the decision point.

39. The navigation system of claim 27, wherein the set of executable instructions further include instructions for dynamically providing the overlay screen for a fixed amount of time.

40. The navigation system of claim 27, wherein the set of executable instructions further include instructions for dynamically providing an overlay screen containing geographic detail of any decision point along the route upon receiving a preview request signal.

41. The navigation system of claim 27, wherein the set of executable instructions further include instructions for dynamically removing insignificant detail from the geographic detail at the decision point based on a set of criteria, wherein the set of criteria includes any one or any combination of the following:
   whether a cartographic detail is a thoroughfare; and
   whether a nearby thoroughfare in the cartographic data intersects with a thoroughfare on which the device is currently traveling.

42. An electronic navigational aid device with an automatic next turn page, comprising:
   a processor;
   a memory adapted to communicate to the processor, the memory having cartographic data and a route to a desired destination stored therein, the cartographic data including data indicative of thoroughfares of a plurality of types;
   a display adapted to communicate with the processor and the memory ard capable of displaying the cartographic data;
   wherein the device processes travel along the route;
   wherein the device provides to the display a presently displayed screen adapted to highlight at least a portion of the route and display motion of the device on the route;
   wherein the device recognizes when the device is approaching a decision point in the route and provides to the display an overlay screen on top of the presently displayed screen, such that at least a portion of the presently displayed screen remains visible, the overlay screen adapted to display a preview of the decision point, including a highlighted portion indicating a course to follow through the decision point, and the overlay screen displays motion of the device on the course through the decision point; and
   wherein the device is adapted to remove insignificant detail from the geographic detail at the decision point based on whether a nearby thoroughfare intersects with a thoroughfare on which the device is currently traveling.

43. The device of claim 42, wherein the overlay screen is provided at a magnified display scale in comparison to a display scale of the presently displayed screen, with the magnified display scale being dependent on a road classification for a thoroughfare on which the device is currently traveling.

44. The device of claim 42, wherein the device dynamically provides the overlay screen to the display in advance of the decision point based at least in part on a speed at which the device is currently travelling.

* * * * *